United States Patent [19]  [11] Patent Number: 4,545,133
Fryszczyn et al. [45] Date of Patent: Oct. 8, 1985

[54] APPARATUS AND METHOD FOR PROLONGING THE SERVICE LIFE OF ELECTRICAL POWER CABLES

[75] Inventors: Bogdan Fryszczyn, South Plainfield, N.J.; George Bahder, deceased, late of Edison, N.J.; Alice Bahder, legal representative, Edison, N.J.

[73] Assignee: American Public Power Association, Washington, D.C.

[21] Appl. No.: 602,506

[22] Filed: Apr. 20, 1984

[51] Int. Cl.⁴ ............................................... F26B 3/06
[52] U.S. Cl. ......................................... 34/21; 36/104; 36/107
[58] Field of Search ..................... 34/107, 104, 21, 36

[56]  References Cited
U.S. PATENT DOCUMENTS 2,100,639 11/1937 Doolittle et al. ................. 34/107
3,252,834  5/1966 Vincent .
3,489,441  1/1970 Malcolm .
3,770,871 11/1973 Goodman .
3,939,882  2/1976 Gillemot .
3,992,569 11/1976 Hankins et al. .
4,075,267  2/1978 Florer .
4,363,168 12/1982 Bryer et al. ...................... 29/869
4,372,988  2/1983 Bahder .............................. 427/52

OTHER PUBLICATIONS

Bahder et al., "Life Expectancy of Crosslinked Polyethylene Insulated Cables Rates 15 to 35 kV", *IEEE Transactions on Power Apparatus and Systems*, vol. PAS-100, No. 4, Apr. 1981.

*Primary Examiner*—Larry I. Schwartz
*Attorney, Agent, or Firm*—Banner, Birch, McKie & Beckett

[57] ABSTRACT

A method and apparatus for retarding electrochemical type decomposition of electrical insulation by flushing moisture from the insulation of installed power cables with a fluid having a low moisture content. The insulation of the power cables is dried and maintained dry by a continuous flow of dry fluid through the conductor and insulation while the cable is energized. An apparatus is disclosed which provides for the fluid to enter and exit from the cable. The disclosed method provides an effective retardation of the growth of electrochemical trees in the insulation structure and thereby significantly extends the useful life of the cable system.

14 Claims, 8 Drawing Figures

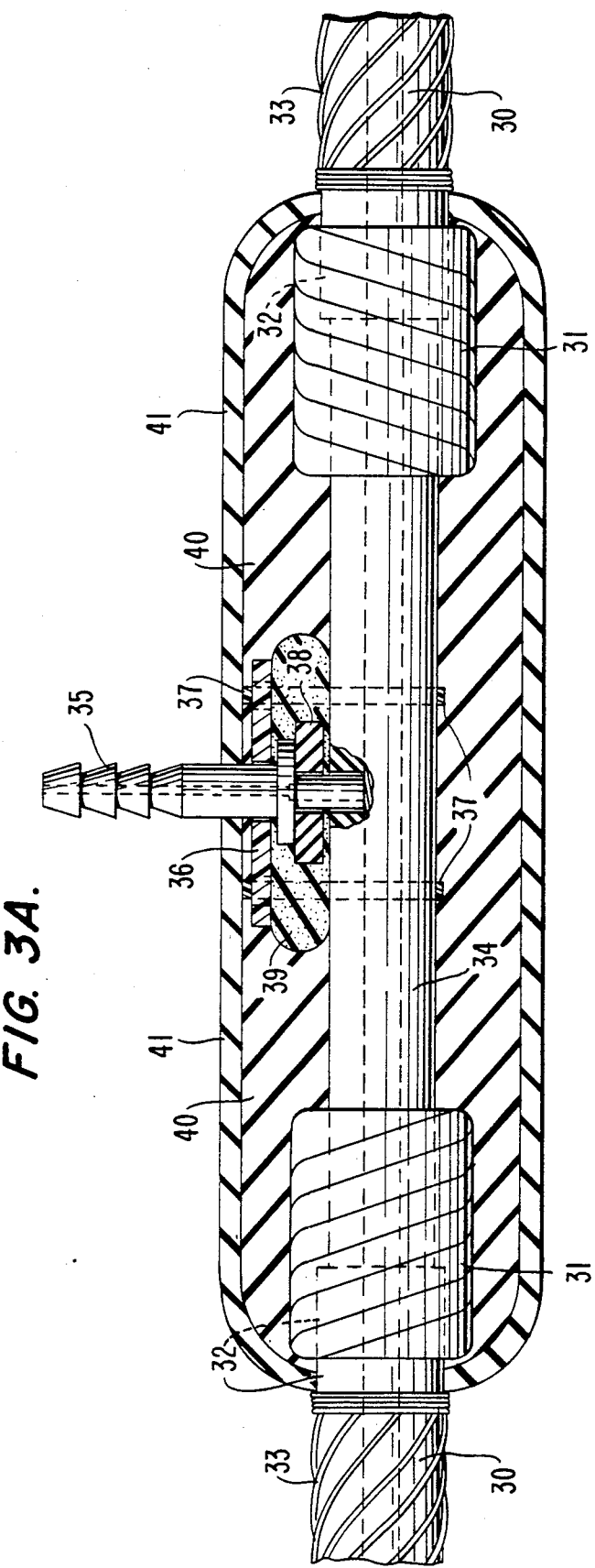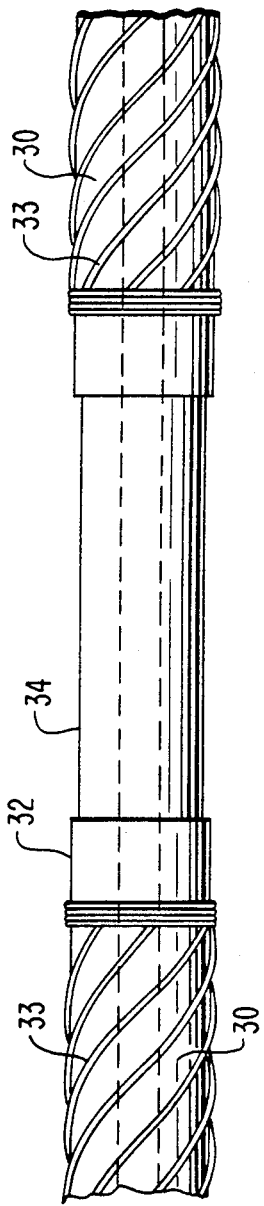

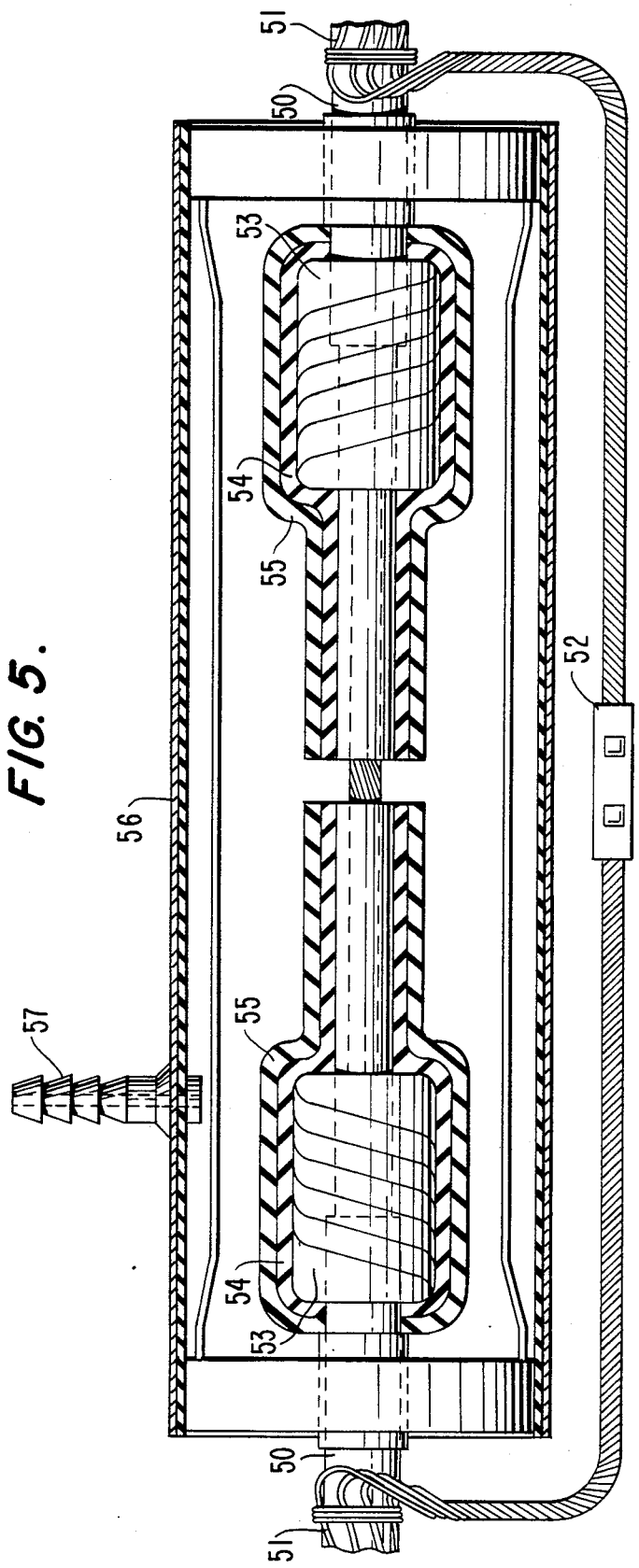
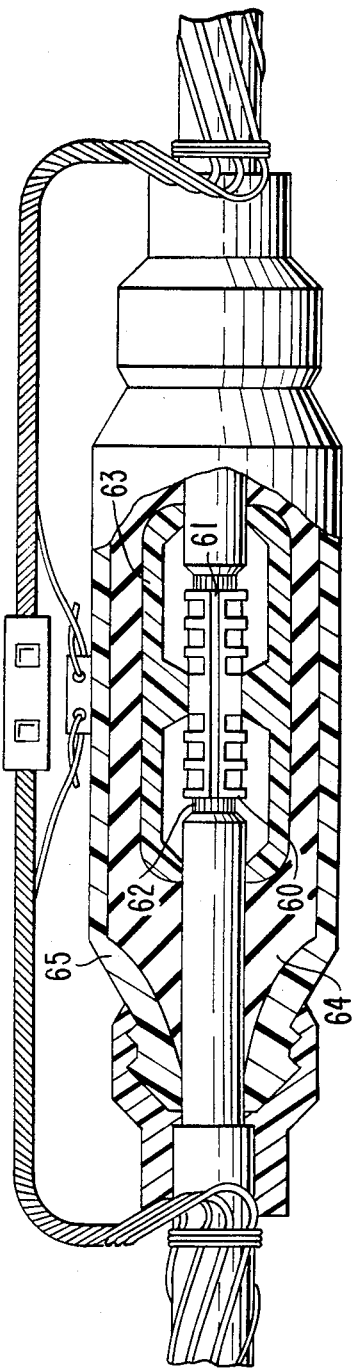
FIG. 5.
FIG. 6.

APPARATUS AND METHOD FOR PROLONGING THE SERVICE LIFE OF ELECTRICAL POWER CABLES

BACKGROUND OF THE INVENTION

This invention relates generally to the field of electrical power distribution, and more particularly, is directed to an apparatus and method for retarding electrochemical type decomposition of the electrical insulation of power distribution cables and thereby prolonging their service life.

Electrical power companies have made wide use of underground distribution, feeder and transmission cables to deliver electrical energy to homes, commercial establishments and industry. One of the problems inherent in underground cable systems is the ingress of moisture into the cable insulating structure, leading to decomposition of the insulation and failure of the cable system. Accordingly, reducing or eliminating the deleterious effects of moisture is of paramount concern to those who design, install or maintain underground power cables and power cable systems.

The typical medium voltage underground power installation operates in the 5,000 to 35,000 volt range (5 to 35 KV) using polyolefin-insulated cables principally of polyethylene (PE), crosslinked polyethylene (XLPE) or ethylene propylene rubber (EPR) material. Cables in these installations are sometimes supplied with an outer protective covering, such as an extruded lead sheath, to prevent the ingress of moisture into the cable insulation. The majority of cables, however, do not have a protective covering and thus the insulation is subjected to the ingress of moisture and its deleterious effects.

In high voltage underground power installations which operate in the 60 to 138 KV range, most cables are supplied with an overall protective covering, such as an extruded polyethylene or polyvinyl chloride jacket, for retarding the ingress of moisture into the cable insulation. Some high voltage cables also use an extruded lead covering.

In underground installations, the cables are buried directly in the ground, installed in ducts or submerged under water. In either method of installation, the cables are exposed to high levels of moisture which leads to rapid decomposition and deterioration of the cable insulation.

It is well known that the intermolecular spaces of polyolefin insulation are relatively large, thus allowing infusion of molecules of moisture or other fluids. This property of polyolefin insulation renders it susceptible to a type of insulation deterioration known as electrochemical tree formation. Electrochemical tree formation is believed to occur in the following manner. Moisture from the environment enters the cable and diffuses throughout the insulation structure via the large intermolecular spaces of the insulation. The high dielectric constant of the moisture tends to assist its movement into areas of the insulation having a lower dielectric constant due to the action of the electric field created by the flow of current through the cable conductor. Furthermore, the moisture tends to break into droplets in the intermolecular spaces and in microvoids and crevices which may be present in the body of the insulation. Electrostatic forces acting on the droplets due to the presence of the electric field, causes the droplets to elongate in the direction of the electric field. As the droplets elongate, the radii of the droplet ends decrease with a corresponding increase in the strength of the electric field at the droplet ends. The strength of the electric field increases to a point where electrical discharge occurs at the ends of the droplets, causing decomposition of the insulation in the region of the discharge. More moisture enters into these regions and the electrical discharge area moves further into the insulation. This process continues throughout the cable insulation, thus creating an electrochemical tree.

Because of electrochemical tree formation in the cable insulation, the breakdown voltage level of the cable is significantly lowered. Often the breakdown level falls below the level of protection provided by surge arrestors in the system and may even fall below the operating voltage level of the system. The latter situation is of particular concern in a high voltage cable system. Thus, electrochemical tree formation in the cable insulation, and the attendant lowering of breakdown voltage, greatly shortens the useful life of the cables. In some cases, the service life is reduced to less then ten years rather than the normal 30 to 40 year service life of cables without insulation deterioration due to electrochemical tree formation.

Because microvoids in the cable insulation are a main place where the formation of electrochemical trees begin, much effort in the prior art has been directed toward the elimination or reduction in size of microvoids during the insulation structure extrusion process. Special extrusion tools and controlled gradient cooling of the insulation structure have succeeded in reducing the number and size of microvoids in the insulation. Furthermore, reducing the number of conducting contaminants in the insulation by special handling and by the use of fine-mesh screens at the insulation extruder has been successful in reducing the number of contaminated areas in the insulation where local high voltage stresses can exist. Reducing the number of contaminated areas helps to retard the formation of electrochemical trees. None of these improvements in the prior art, however, have been successful in sufficiently eliminating microvoids in order to prevent electrochemical tree formation altogether.

Moisture impervious outer coverings, such as extruded lead and aluminum sheaths, provide a means for preventing moisture ingress into the cable insulation as explained above. However, these coverings have proven useful in only a limited number of applications for technical reasons and high cost. The technical reasons have chiefly to do with the high coefficient of thermal expansion of polyolefin insulations. When the temperature of metallic covered cables having polyolefin insulation rises, e.g., due to the current flowing in the cable conductor, the insulation expands and stretches the diameter of the metallic covering. In many cases when this occurs, the elastic limit of the materials in the covering is exceeded. Thus, when the cable cools and the diameter of the insulation returns to its original size, the metal sheath remains expanded. Therefore, a longitudinal channel or void is left between the metal sheath and the cable insulation. If the metal sheath loses its imperviousness to moisture, e.g., due to corrosion, pinhole formation or other mechanical damage, moisture can enter into the longitudinal space under the sheath and subsequently migrate into the cable insulation as explained above.

Where lead is used as the sheath material, an additional disadvantage is present. Lead sheaths tend to develop an insulating corrosive layer on the inside surface of the sheath adjacent to the insulation shield. The presence of a corrosive layer leads to electrical discharges between the lead sheath and the semiconducting layer of insulation shielding material. These discharges can result in premature failure of the cable. A further disadvantage of lead sheaths is that when the diameter of the sheath is increased due to expansion of the polyolefin insulation as a result of heat, the length of the sheath contracts. Contraction of the sheath creates longitudinal forces in the sheath which are high and difficult to control. These forces often result in the sheath being pulled away from cable splice boxes and cable terminations. Thus, the integrity of the cable system is compromised and moisture is permitted to enter the cable at the splice boxes and terminations and can flow along the longitudinal void between the sheath and cable insulation structure.

Cable sheaths made of corrugated longitudinally applied copper or aluminum have recently been used in place of extruded lead or aluminum. Cable sheaths made in this manner are not welded at the longitudinal seam. The metal is folded over itself, leaving a longitudinal opening extending along the entire length of the cable. Even though a sheath made with copper or alumnium has an extruded polyethylene jacket applied over it, moisture can still enter the longitudinal opening and diffuse into the underlying insulation structure. Studies have shown that even if a satisfactory outer covering impervious to moisture is devised, it most likely will be too expensive for general use on power distribution cables.

There are a large number of underground polyolefin insulated cables currently in service which do not have moisture resistant outer coverings. The insulation on many of these cables have deteriorated due to electrochemical tree formation. Accordingly, the service life of these cables will be significantly shorter than normal. Some of these cables, particularly those installed in ducts, can be replaced; but replacement is extremely difficult and costly. Consequently, a more expedient and less costly system of maintaining cable installations is needed. The method and apparatus disclosed herein is considered a more desirable and useful alternative.

SUMMARY OF THE INVENTION

It is the overall object of the present invention to provide a method and apparatus for prolonging the service life of electrical power cables.

It is a specific object of the present invention to provide a method and apparatus for retarding the formation of electrochemical trees in the electrical insulation of power cables, thereby prolonging the service life of the cables.

It is a further specific object of the present invention to provide a method and apparatus for reversing the effects of electrochemical tree formation in the electrical insulation of installed power cables, thereby prolonging the service life of the cables.

It is a still further specific object of the present invention to provide an electrical cable system which is relatively immune to electrochemical tree formation in the cable insulation in the presence of environmental moisture.

It is another specific object of the present invention to provide a method and apparatus for introducing a dry fluid into the insulation structure of electrical power cables.

It has been discovered that the formation of electrochemical trees can be greatly retarded if the moisture in the intermolecular spaces and voids existing in the insulation structure is removed. When this occurs, the dielectric strength of the cable is significantly increased, sometimes almost to the level existing prior to the formation of the electrochemical trees. This is due principally to the fact that the tree channels are small in diameter and the walls of the channels are a reasonably good insulators. An important feature of this invention is the removal of moisture from the channels of the electrochemical trees by flushing the insulation structure with a dry fluid such as air or nitrogen.

In accordance with the present invention, a dry fluid is introduced into the stranded cable conductor from which it diffuses through the conductor shield and polyolefin insulation. The introduction of fluid can take place at the time of installation of the cable. As the dry fluid diffuses through the cable, moisture is flushed from the insulation structure. If dry fluid is maintained flowing through the cable, moisture will be prevented from re-entering the cable insulation structure. Thus, the formation of electrochemical trees will be retarded and the dielectric strength of the cable will not be adversely affected. The dry fluid may also be introduced into the stranded conductor after the cable has been in service for a number of years. Thus, the effects of electrochemical tree formation can be reversed and the dielectric strength of the cable significantly increased.

BRIEF DESCRIPTION OF THE DRAWINGS

FIGS. 3A, 3B and 3C illustrate one embodiment of a weather-protected enclosure for introducing dry fluid into a cable in accordance with the present invention.

FIG. 5 illustrates a cable connected to a weather-protected enclosure in an area exposed to the weather or to the underground environment for introducing a dry fluid into the cable in accordance with the present invention.

FIG. 6 illustrates a cable connected to a splice which permits the flow of the dry fluid past the splice in accordance with the present invention.

DETAILED DESCRIPTION OF THE PREFERRED EMBODIMENT

Figure 1:
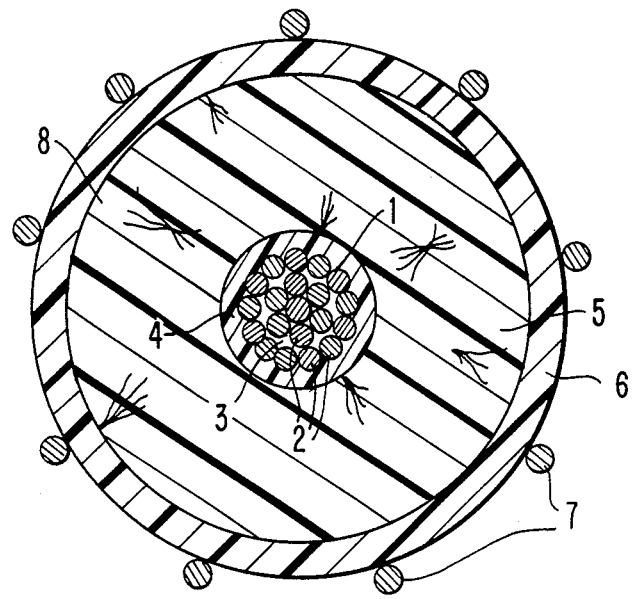
FIG. 1 is a cross-sectional view of a polyolefin insulated extruded cable illustrating the formation of electrochemical trees in the cable insulation.

It has been discovered that the formation of electrochemical trees in polyolefin insulated cables can be prevented or substantially retarded by flushing the insulation structure with a dry fluid. Accordingly, the dielectric strength of the cable insulation can be maintained at or near its original value.

No. 14 AWG stranded cable having an insulation of unfilled XLPE 50 mils thick and having a semiconducting conductor shield and an insulation shield were immersed in ambient temperature tap water and acceleratedly aged for a period of 107 days at an average voltage stress of 86 volts/mil at a frequency of 8 kHz. Slicing the insulation into thin wafers and dyeing the wafers demonstrated the presence of electrochemical trees throughout the insulation wall structure similar in appearance to trees found in polyolefin insulated power cables removed from actual service. Dry nitrogen was passed through the cable conductor after the 107 day immersion period. Samples were removed from the immersion tank at specified intervals and the dielectric strength of the cable at a frequency of 60 Hz at ambient temperature was measured. The results obtained are shown in Table 1.

TABLE 1

Dielectric Strength-No. 14 AWG Cables Flushed with Dry Nitrogen

| Time, Condition of Sample | Voltage Breakdown in kV, Avg. 5 Samples |
| --- | --- |
| Prior to Immersion, New Cable | 71 |
| After 3½ Months of Accelerated Aging in Water | 21 |
| After 17 Days Flushing with Dry Nitrogen While Still Immersed in Water | 29 |
| After 31 Days Flushing with Dry Nitrogen While Still Immersed in Water | 32 |

Similar accelerated aging was performed on commercial 15 kV PE insulated cables with a continuous average voltage stress of 86 volts/mil at a frequency of 60 Hz. After aging, the voltage breakdown of the cables was measured. The results obtained at various time periods are shown in Table 2.

TABLE 2

Dielectric Strength - 15 kV Cables Flushed with Dry Nitrogen

| Time, Condition of Sample | Voltage Breakdown in kV, Avg. 5 Samples |
| --- | --- |
| (1) Prior to Immersion, New Cable | 225 |
| (2) After 510 days of aging in water | 77 |
| (3) After (2) above, samples removed from water and placed in 95° C. oven for 14 days | 200 |
| (4) After (2) above, samples flushed with dry nitrogen through conductor for 60 Days while in water and under voltage | 120 |
| (5) After (2) above, samples flushed with dry nitrogen through conductor for 91 days while in 70° C. water and under voltage | 144 |

The results presented in Tables 1 and 2 show that the dielectric strength of polyolefin insulated cables having electrochemical trees in the insulation can be restored almost to that of a new cable if the moisture is completely removed from the insulation. Thus, the service life of polyolefin insulated cables may be significantly extended, perhaps by as much as 8-15 years. If the cables were left untreated, the formation of electrochemical trees would prematurely decreased the dielectric strength of the cable insulation to a level where routine switching and/or lightning surges would cause the cable to breakdown electrically. In extreme cases, the low dielectric strength would result in the cable breaking down even at normal operating voltages. Additionally, D.C. test voltages or fault locating voltages could also cause the weakened cable to fail.

The time to voltage breakdown of an underground polyolefin insulated cable having electrochemical trees in the insulation can be estimated by the following power equation:

$$E_1^h \times t_1 = E_0^h \times t_0 = K$$

where:
$E_0$ = voltage breakdown strength of cable prior to drying with fluid
$t_1$ = time to breakdown if cable is not dried
$t_0$ = time to breakdown after cable is dried
$E_1$ = voltage breakdown strength of cable after drying with fluid
$h$ = a constant in the range of 3 to 7 depending on severity of electrochemical trees
$K$ = a constant Referring to Table 2, the dielectric strength of a 15 kV cable can be increased by a factor of $1.87 \times 144/77$ by drying the cable insulation with nitrogen. If a 15 kV cable with electrochemical trees has an estimated life of 5 years and if it is assume that $h=3$, which has been found to be a reasonable value, then the life of such a cable after drying is estimated to be 32.6 years, i.e.:

$$77^3 \times t_0 = 144^3 t_1$$

$$t_0 = 144^3/77^3 \times t_1 = 1.87^3 \times 5 = 32.6$$

A typical electrical power cable to which the present invention can be applied is comprised of a stranded electrical conductor which is surrounded by a conductor shield having a semiconducting material, a polyolefin insulation such as PE, XLPE or EPR, a semiconducting insulation shield, a metallic shield or a concentric metallic conductor and an optional polyolefin jacket as, for example, made of PE or PVC material.

FIG. 1 shows a cross-section of a typical polyolefin insulated extruded cable to which the present invention is applicable. Conductor 1 of the cable is comprised of a plurality of strands 2 of, for example, copper wire. Strands 2 may be conventionally formed without compression or may be compressed in which case the voids or interstices 3 between the strands are smaller. Surrounding conductor 1 is semiconducting shield 4 which typically is comprised of a carbon filled extruded plastic or rubber material having a thickness of approximately 30 mils. Surrounding conductor shield 4 is extruded polyolefin insulation 5 which is comprised of a material such as PE, XLPE or EPR. Surrounding insulation 5 is insulation shield 6 which typically is comprised of a carbon filled extruded plastic or rubber material also having a thickness of approximately 30 mils. Surrounding insulation shield 6 is metallic shield 7 comprising, for example, wires, flat ribbon or tape. Metallic shield 7 may also be covered by a polyolefin jacket, not shown.

As discussed above, cables of the type illustrated in FIG. 1 are susceptible to electrochemical tree formation when environmental moisture diffuses into the intermolecular spaces existing in the polyolefin insulation and the insulation is subjected to high voltage stresses. These stresses are highest in regions of the cables having imperfections such as contaminants or protrusions from the semiconducting shield. Such regions are illustrated by reference numeral 8 in FIG. 1. Under the effect of these stresses, droplets of moisture, which have a high dielectric constant, are caused to be elongated in the direction of the electric field due to the electrostatic forces acting on the droplets. When the droplets elongate, the radii of the droplet ends decrease with a corresponding increase in the intensity of the electric field at the droplet ends. The intensity of the electric field continues to increase until an electric discharge occurs at the droplet ends. Under A.C. voltages, these discharges occur very frequently and cause the insulation material closest to the ends of the droplets to decompose. Additional moisture then flows into the regions of decomposition. As the decomposition process continues, small channels or voids are formed in the insulation in a "tree-like" pattern. Electrochemical trees are illustrated, in greatly enlarged form, in the area indicated by reference numeral 8 in FIG. 1.

It has been discovered that if the moisture in the insulation is continually removed by flushing with a dry fluid such as nitrogen, the growth of electrochemical trees in the cable insulation is significantly retarded. The life of a cable can be extended a great number of years if the moisture entering the insulation is continuously removed by flushing, thereby preventing or significantly retarding, electrochemical tree formation in the cable insulation.

A preferred method for flushing the insulation with dry fluid is by introducing the fluid into stranded conductor 1 (FIG. 1) of the cable. The fluid flows along the entire length of the cable via interstices 3 between the strands of conductor 1. The fluid exits from the conductor at the distant end and also flows out through the cable insulation and jacket into the environment. During the course of the flow of fluid, moisture is forced from the conductor and from the voids existing in the insulation, particularly those voids near the conductor. The flushing must be continuous in order to prevent moisture from the environment from reentering the cable and cable insulation.

It will be noted that the above described method for drying cable insulation is particularly advantageous where the cable is already in service. In cases where the removal of moisture saturated cables would prove to be both difficult and prohibitively expensive, flushing the moisture from the cable as described above is especially advantageous. The above method requires only that the ends of the cable be exposed so that dry fluid may be introduced into and exited from the conductor of the cable.

Figure 2:
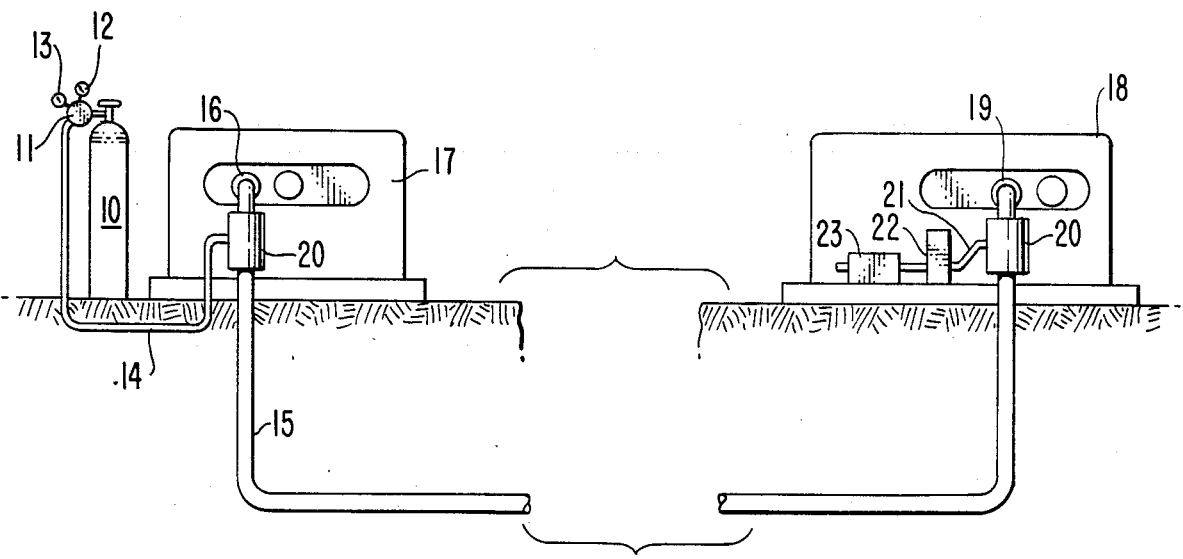
FIG. 2 is a block diagram of a typical electrical power cable installation which is connected to an apparatus for drying the cable in accordance with the present invention.

FIG. 2 shows an installation which may be used for flushing a cable with dry nitrogen. The installation comprises a number of novel elements, all of which are a part of the present invention and are explained below with respect to FIGS. 2, 3A, 3B and 3C.

With reference again to FIG. 2, tank 10 may be a commercially available gas cylinder filled with dry nitrogen at high pressure. The output of cylinder 10 is connected to regulator 11 which permits the pressure of the fluid to be regulated as indicated by pressure meters 12 and 13.

Flexible plastic tubing 14, which is made of a material having high electrical insulating characteristics, connects regulator 11 to cable 15 which is being flushed. In this illustration, one end of cable 15 is terminated in elbow 16 which is connected to pad-mounted transformer 17. At the distant end, cable 15 is terminated at pad-mounted transformer 18 by means of elbow 19. Attached to cable 15 is fluid entry and exit device 20 which will be described in detail below with reference to FIG. 3. Device 20 provides a small hole through the insulation of the cable to permit entry of fluid from cylinder 10 to the stranded conductor of the cable. At the distant end of cable 15, fluid exits from the cable through a second entry and exit device 20 via flexible plastic tubing 21 to meters 22 and 23. Meter 22 measures the rate of flow of the fluid as it exits from the cable and meter 23 measures the relative humidity of the fluid.

Figure 3C:
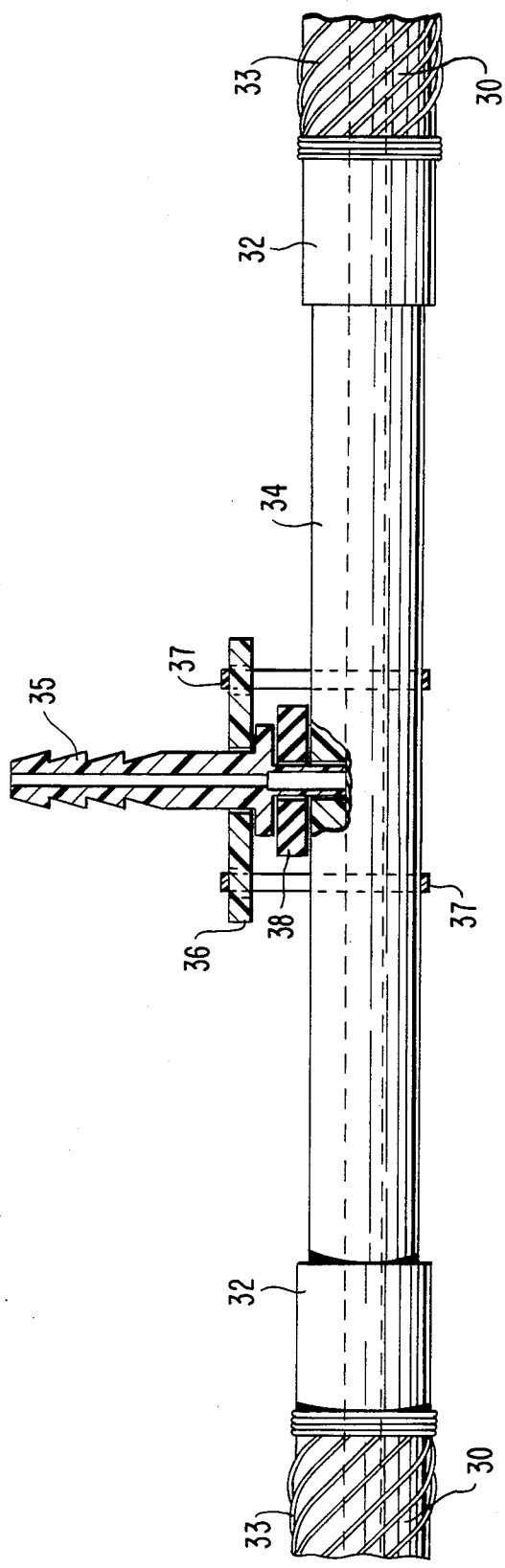

FIGS. 3A–3C illustrate in more detail the construction and installation of entry and exit device 20 mentioned above. Shielded cable 30, similar to cable 1 described in FIG. 1, is shown "double terminated" with voltage stress grading tape 31. The initial step in installing entry and exit device 20 is to strip insulation shield 32 and metallic wires 33 as shown in FIG. 3B. A small hole is formed through exposed insulation 34 near the center of the section of the cable where the insulation shield has been removed as shown in FIG. 3C. Plastic hose connection 35 is fastened tightly over the hole by plastic holders 36, plastic ties 37 and rubber washer 38 so fluid does not leak to the environment at internal fluid pressures up to 50 psig. Materials used in the construction of connector 35, holder 36, ties 37 and washer 38 sould be excellent electrical insulators. The region between washer 38 and the cable insulation is filled with electrical insulating soft putty 39. A few layers of electrical insulating tape 40 is placed over cable insulation 34, washer 38, putty 39 and voltage stress relief tape 31 and an overall anti-tracking tape 41 is applied overall (see FIG. 3A). Entry and exit device 20, therefore permits the entry and exit of fluid used to dry the cable insulation even when the cable is in service under normal operating conditions.

Cylinder 10, as shown in FIG. 2, has a two-stage fluid regulator 11 to regulate the fluid flow and pressure in the cable in the pressure range of 0 to 50 psig. It has been found that maintaining a flow rate at the exit of the cable of about 50 cubic centimeters per minute is sufficient to dry up to 1000 feet of underground cable and maintain it dry even though the cable maybe immersed in water. The radial flow of the fluid through the insulation structure is relatively small even at a pressure of 50 psig. The pressure required to maintain the flow of 50 cubic centimeters per minute depends on the length of the cable and on the size of the conductor. For smaller size conductors, such as 2 AWG having 7 strands, the pressure required to maintain the required flow of fluid is about 35 psig for approximately 1000 feet of cable; whereas for a large size conductor, such as 500 kcmil having 37 strands, the pressure is much less, about 1 psig for approximately 1000 feet of cable. It is estimated that three commercial size cylinders (each containing about 10 kg of nitrogen) per year are required to maintain a sufficient flow of fluid on a typical single phase cable installation 1000 feet long. In typical cable installations where the cable has been in service for a number of years and has formed electrochemical trees in the insulation, it has been found desirable to maintain the relative humidity of the fluid at the exit of the cable at 50% or less to achieve the required drying. The rate of flow and the relative humidity of the flushing fluid at the exit of the cable is monitored by hygrometer 23 and flow meter 22 as shown in FIG. 2. Both of these instruments are small and inexpensive and can be easily located inside pad-mounted transformer 18.

Figure 4:
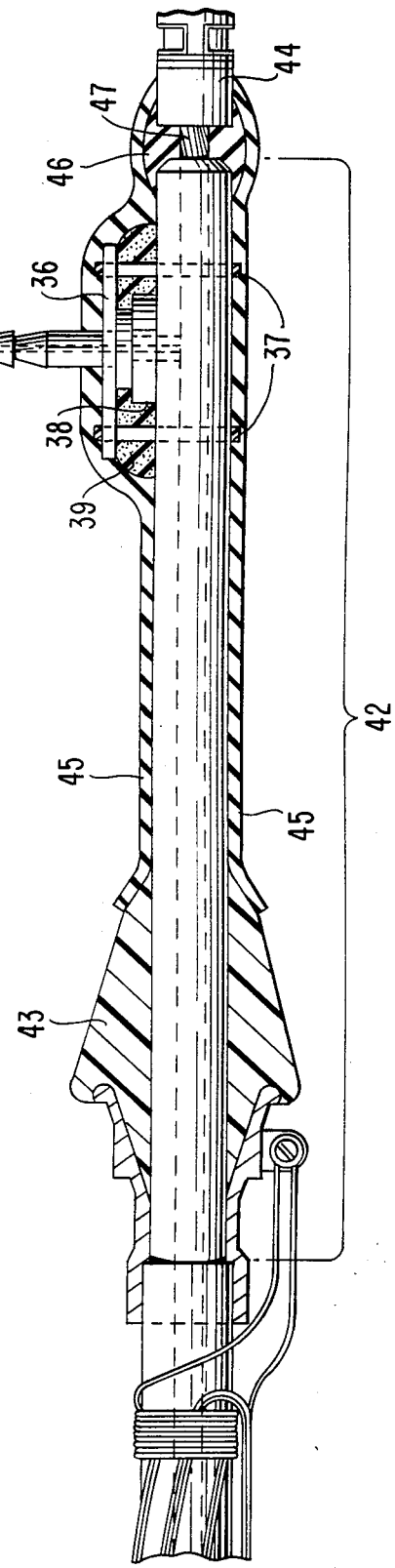
FIG. 4 illustrates a cable termination connected to a weather-protected enclosure for introducing dry fluid into the cable in accordance with the present invention.

As indicated previously, FIGS. 3A, 3B and 3C show how fluid for drying a cable can enter or exit a cable having a metallic shield in an environment protected from the weather. FIG. 4 describes an embodiment of the invention where the drying fluid enters or exits a cable termination when the cable termination is protected from the weather. The outer coverings, including the insulation shield, is removed over length 42 of one foot or more. A voltage stress relief cone 43 and metal connector 44 are placed over the cable insulation and conductor, respectively. The area between stress cone 43 and connector 44 is covered with silicone insulating tape 45 which has superior electrical tracking resistance. The installation of the gas entry and exit device is similar to that previously described with respect to FIGS. 3A–3C above. To insure that the fluid entering the cable travels along the conductor, a small bump 46 of self-fusing electrical insulating tape can be built over the cable conductor 47 between the cable insulation and metallic connector 44.

Another embodiment of the invention is shown in FIG. 5 where the cable is exposed to the earth or to the outside weather. In this embodiment, cable 50 has had the helically applied neutral wires 51 removed for approximately 2 feet and twisted together and connected at connection 52. The insulation shield of the cable is removed for about 18 inches. In the center of this, the cable insulation and conductor shield are removed to expose the conductor for about 0.25 inches to allow entry or exit of drying fluid to the conductor. Voltage stress relief tape 53 is applied over the ends of the insulation shield and along about 3 inches of the insulation. High voltage insulating tape 54 is then applied overall followed by silicone rubber anti-tracking tape 55. A metallic splice case 56 is then applied over this configuration which prevents moisture ingress and provides other protection from the environment. Splice case 56 is connected to ground. Connector 57 is connected to the gas tubing to allow fluid to flow in or out of the splice case. The dimensions of the splice case are such that the configuration supports the system BIL and the partial discharge extinction voltage at 60 Hz is at least 1.5 times the operating voltage of the cable system.

The apparatus described above provides a means for the drying fluid to enter or exit a cable which is being dried in accordance with the present invention. The apparatus is suitable for use directly buried in the earth and thus can provide a means for the fluid to enter and exit a cable when the cable itself is not available above ground. The apparatus also is suitable for use above ground when the entry or exit part of the cable is not available in a weather-protected atmosphere.

In order for the drying fluid to pass through splices in underground cables, it is sometimes necessary to modify the splices. This can be accomplished by replacing the metallic connector in use with one having a longitudinal groove to permit the flow of fluid and a splice which permits the flow of fluid in combination with the grooved connector. FIG. 6 shows such a splice in accordance with the present invention which permits the flow of fluid. Metallic connector 60 replaced the original metallic connector. Connector 60 has a longitudinal groove 61 which permits the flow of drying fluid from stranded conductor 62 on one side of the connector to the other side, by-passing the semiconducting inner insulation shield 63 of the molded splice. The remainder of the splice, i.e., insulation 64, outer semiconducting insulation shield 65 and the slip-on grommets are the same as conventional splices normally used in underground cable splicing.

Obviously many modifications and variations of the above-described preferred embodiments of the present invention will become apparent to those skilled in the art from a reading of this disclosure. It should be realized that the invention is not limited to the particular system disclosed, but its scope is intended to be governed only by the scope of the appended claims.

We claim:

1. A method for flushing moisture from the insulation of a electrical cable having a center conductor to thereby retard decomposition of the insulation, said method comprising the steps of:
    forming a passageway through the cable insulation to said conductor at a first point along the cable; and
    continuously introducing into said passageway for the service life of the cable a dry fluid at a pressure in the range of 1–50 p.s.i., wherein said dry fluid flows along the length of said conductor and out through the cable insulation to thereby flush moisture from the insulation.

2. The method of claim 1 wherein said dry fluid is nitrogen.

3. The method of claim 1 further comprising the step of adjusting the pressure at which said dry fluid is introduced into said passageway to maintain a flow rate of said dry fluid of 50 cubic centimeters per minute at a predetermined distance along said conductor from said passageway.

4. The method of claim 3 wherein said predetermined distance is within a range up to 1000 feet.

5. The method of claim 1 further comprising the step of adjusting the pressure at which said dry fluid is introduced into said passageway to maintain a flow of said fluid having a relative humidity of below 50% at a predetermined distance along said conductor from said passageway.

6. The method of claim 5 wherein said predetermined distance is within a range up to 1000 feet.

7. A system for retarding decomposition of the insulation of electrical cables having a stranded conductor by flushing moisture from the conductor and insulation, said system comprising:
    a supply of dry fluid;
    regulator means connected to said supply of dry fluid for providing a constant flow of fluid at a pressure in the range of 1–50 p.s.i.;
    fluid introduction means, attached to said regulator means and to said electrical cable at a first predetermined point for continuously introducing a flow of said dry fluid into the interstices of said stranded conductor for the service life of the cable;
    fluid exit means attached to said cable at a second predetermined point for permitting said dry fluid to escape from the interstices of the stranded conductor; and
    wherein the flow of said dry fluid through the interstices of said stranded conductor between said first and second predetermined points flushes moisture from said stranded conductor and cable insulation.

8. The system of claim 7 wherein said dry fluid is nitrogen.

9. The system of claim 7 further comprising fluid flow measuring means attached to said fluid exit means for measuring the flow of said dry fluid exiting from the interstices of the stranded conductor, wherein the flow of said dry fluid is maintained at 50 cubic centimeters per minute.

10. The system of claim 7 further comprising humidity measuring means attached to said fluid exit means for measuring the relative humidity of said dry fluid existing from the interstices of the stranded conductor, wherein the relative humidity of said fluid is maintained below 50%.

11. The system of claim 7 wherein the distance between said first and said second predetermined points is within a range up to 1000 feet.

12. A system for retarding decomposition of the insulation of electrical cables having a stranded conductor by flushing moisture from the conductor and insulation, said system comprising:
- a supply of dry fluid;
- regulator means connected to said supply of dry fluid for providing a constant flow of fluid at a pressure in the range of 1–50 p.s.i.;
- fluid introduction means, attached to said regulator means and to said electrical cable as a first predetermined point for introducing a flow of said dry fluid into the interstices of said stranded conductor;
- wherein the flow of said dry fluid through the interstices of said stranded conductor between said first and said second predetermined points flushes moisture from said stranded conductor and cable insulation; and
- wherein said fluid introduction means comprises:
- a substantially T-shaped device having a lower portion extending below the T and an upper portion extending above the T and being adapted for connection to said regulator means, said T-shaped device having an enclosed channel extending completely through said upper and lower portions, said channel being open at both ends, said lower portion rigidly extending through a hole formed in the cable insulation, the end of said lower portion being in intimate contact with the stranded conductor;
- securing means in intimate contact with the T of said T-shaped device for securing said device to said cable; and
- insulation means completely covering said securing means to provide a fluid tight coupling between said T-shaped device and the cable.

13. A method of introducing a dry fluid into an electrical cable having a plurality of stranded conductors, an electrical conducting shield over the stranded conductors, an insulation over the conducting shield, an insulation shield over the insulation, and a metallic shield over the insulation shield, said method comprising the steps of:
- removing a predetermined length of said metallic shield from a section of the cable;
- removing a predetermined length of said conducting shield from said section of cable to thereby expose said insulation;
- forming a passageway through the exposed said insulation and said conducting shield to said stranded conductors at the approximate center of the length of exposed said electrical insulating material;
- installing a connecting device in said passageway so as to permit dry fluid introduced to said connecting device to freely flow to said stranded conductors, wherein said connecting device is rigidly secured in fluid sealing engagement with said electrical insulating material;
- overlapping each opposed end of said conducting shield and said insulation with a plurality of layers of voltage stress relief tape;
- overlapping the complete length of exposed said insulation with a plurality of layers of electrical insulating tape; and
- overlapping said plurality of layers of electrical insulating tape with a plurality of layers of anti-tracking tape.

14. The method of claim 13 wherein said step of overlapping the complete length of exposed said insulation with a plurality of layers of electrical insulating tape and the step of overlapping said plurality of layers of electrical insulating tape with a plurality of layers of anti-tracking tape substantially seals said section of cable from the ingress of moisture.

* * * * *